United States Patent [19]

Sharma

[11] Patent Number: 5,294,650
[45] Date of Patent: Mar. 15, 1994

[54] PROCESS FOR PREPARING SULFO-POLYESTER/ACRYLIC RESIN BLENDS WITHOUT VOLATILE ORGANIC COMPOUNDS

[75] Inventor: Mahendra K. Sharma, Kingsport, Tenn.

[73] Assignee: Eastman Chemical Company, Kingsport, Tenn.

[21] Appl. No.: 14,602

[22] Filed: Feb. 8, 1993

[51] Int. Cl.$^5$ .......................... C08K 5/42; C08L 67/02
[52] U.S. Cl. ................................. 523/523; 523/501; 524/513; 524/388; 525/167; 525/173; 525/174; 525/176
[58] Field of Search ............... 523/501, 523; 524/513, 524/388; 525/167, 173, 174, 176

[56] References Cited

U.S. PATENT DOCUMENTS

| | | | |
|---|---|---|---|
| 4,704,309 | 11/1987 | Coney et al. | 427/258 |
| 4,738,785 | 4/1988 | Langston et al. | 210/738 |
| 4,921,899 | 5/1990 | Phan et al. | 524/513 |
| 4,996,252 | 2/1991 | Phan et al. | 524/513 |
| 5,006,598 | 4/1991 | Adams et al. | 524/513 |
| 5,039,339 | 8/1991 | Phan et al. | 428/513 |
| 5,075,364 | 12/1991 | Phan et al. | 524/513 |
| 5,156,651 | 10/1992 | Girardeau et al. | 523/501 |

*Primary Examiner*—Paul R. Michl
*Assistant Examiner*—Peter Szekely
*Attorney, Agent, or Firm*—John D. Thallemer; William P. Heath, Jr.

[57] ABSTRACT

This invention relates to a process for preparing aqueous blends of sulfo-polyesters and solid acrylic resins without volatile organic compounds (VOC's) and surfactants. More specifically, the acrylic resins are characterized by an inverse relationship between the molecular weight and acid number of the resin, and the sulfo-polyesters contain at least 12 mole percent of a difunctional sulfomonomer. The aqueous sulfo-polyester/acrylic resin blends of the present invention are useful in inks, overprint varnishes, primers, paints, and coatings.

19 Claims, No Drawings

PROCESS FOR PREPARING SULFO-POLYESTER/ACRYLIC RESIN BLENDS WITHOUT VOLATILE ORGANIC COMPOUNDS

FIELD OF THE INVENTION

This invention relates to a process for preparing aqueous blends of sulfo-polyesters and solid acrylic resins without volatile organic compounds (VOC's) and surfactants. More specifically, the acrylic resins are characterized by an inverse relationship between the molecular weight and acid number of the resin, and the sulfo-polyesters contain at least 12 mole percent of a difunctional sulfomonomer. The aqueous sulfo-polyester/acrylic resin blends of the present invention are useful in inks, overprint varnishes, primers, paints, and coatings.

BACKGROUND OF THE INVENTION

Organic solvents that evaporate during the application of coatings and inks contribute significantly to a wide variety of air quality problems. Sunlight is one of the key factors that cause these chemicals to react with each other, thus the term "photochemical smog". These polluting organic solvents are most commonly referred to as Volatile Organic Compounds (VOC's). Ozone is formed by photochemical reactions between nitrogen oxides from fuel combustion and VOC's. Elevated ozone concentrations reduce lung function, aggravate allergies, damage vegetation and cause eye irritations.

Consequently, the Environmental Protection Agency (EPA) and local Air Quality Management Districts have stepped up their efforts to regulate the amount of VOC's. Although coating and ink formulations represent only a small segment of the total market, any reduction of VOC's from these products will help achieve acceptable environmental conditions, and help prepare the industry for the probability of more stringent air pollution regulations in the future.

U.S. Pat. Nos. 4,704,309 and 4,738,785 relate to aqueous ink compositions containing a water dispersible sulfo-polyester. Inks containing such water dispersible sulfo-polyesters have many desirable properties such as good adhesion to a variety of substrates and a wide viscosity range. However, such inks display poor water resistance and poor block resistance on certain substrates.

U.S. Pat. Nos. 4,921,899 and 5,075,364 disclose ink compositions containing water dispersible sulfo-polyesters, acrylic polymer emulsions, surfactants and volatile organic compounds. Inks containing the blend of these polymers exhibit improved block, alcohol and water resistance as compared to inks containing the water dispersible polyester alone. The presence of surfactants, however, in the ink formulations creates several problems related to ink stability, printing process and print quality of the ink film.

U.S. Pat. Nos. 4,996,252 and 5,039,339 disclose ink compositions containing blends of water dispersible sulfo-polyesters and acrylic polymer emulsions. The acrylic polymer emulsions have molecular weights of greater than 200,000. In contrast, the blends of the present invention do not contain acrylic polymer emulsions.

Copending commonly assigned U.S. Pat. application Nos. 638,929 and 638,912 disclose processes for preparing water-dispersible sulfo-polyesters and acrylic resin blends. However, the acrylic resins used in the preparation of the blends require volatile organic compounds in the range of 7-15 weight percent. Without such volatile compounds, the blends gel upon cooling.

The present inventor has unexpectedly developed a process for preparing blends of water dispersible sulfo-polyesters and acrylic resins which do not contain volatile organic compounds and surfactants. Moreover, the present inventor has unexpectedly determined that a correlation exists between the molecular weight and the acid number of the acrylic resin. The blends produced by the process of the present invention provide ink compositions with good water resistance and good block resistance.

SUMMARY OF THE INVENTION

It is therefore an object of the present invention to provide a process for preparing blends of water dispersible sulfo-polyesters and acrylic resins which exhibit good water resistance and good block resistance.

Another object of the present invention is to provide a process for preparing blends of water dispersible sulfo-polyesters and acrylic resins which do not contain volatile organic compounds.

These and other objects are accomplished herein by a process for preparing aqueous sulfo-polyester/acrylic resin blends without volatile organic compounds, said process comprising the following steps:

(A) contacting a solid acrylic resin with a solubilizing amount of an alkaline solution comprising an amine or ammonium compound dissolved in water so as to achieve an acrylic resin solution having a pH of at least 8, said acrylic resin comprising repeating units of the formula

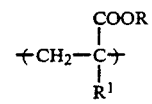

wherein R is selected from the group consisting of hydrogen and an alkyl group having 1 to 20 carbon atoms, and $R^1$ is selected from the group consisting of hydrogen and methyl, provided that the molecular weight and acid number of the acrylic resin is inversely related;

(B) heating the acrylic resin solution of step (A) at a temperature of 60° C. to 99° C. to result in an acrylic resin solution having a pH of 7.5 to 9;

(C) contacting the acrylic resin solution of step (B) with a water dispersible polyester consisting essentially of repeat units from:

(a) a dicarboxylic acid selected from the group consisting of aromatic dicarboxylic acids, saturated aliphatic dicarboxylic acids, cycloaliphatic dicarboxylic acids, and combinations thereof;

(b) a diol; and (c) a difunctional sulfomonomer containing at least one sulfonate group attached to an aromatic nucleus wherein the functional groups are hydroxy, carboxy or amino, provided the difunctional sulfomonomer is present in an amount from 12 to 25 mole percent based on 100 mole percent dicarboxylic acid and 100 mole percent diol;

said contacting occurring under agitation and at a temperature of 60° C. to 99° C. to result in a polymer blend wherein the sulfo-polyester is dispersed in the acrylic resin solution, and the weight ratio of acrylic resin to sulfo-polyester is 10:90 to 90:10; and (D) cooling the polymer blend while applying agitation.

DESCRIPTION OF THE INVENTION

The process of the present invention involves four steps. In the first step, an essentially solid acrylic resin is added to an alkaline solution to form an acrylic resin solution. It is important that agitation be applied to the solution while the addition is taking place. The alkaline solution may comprise an amine or ammonium compound dissolved in water. Examples of useful amine or ammonium compounds are ammonium hydroxide, methyl amine, methyl ethyl amine, and the like. The amine or ammonia compounds should be present in an amount such that the acrylic resin has a pH of at least about 8. A pH of less than about 8 results in precipitation and/or separation of the acrylic resin. The first step is preferably conducted at a temperature of from 18° C. to 50° C.

The acrylic resin contains repeating units of the formula

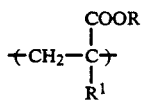

wherein R is hydrogen, or an alkyl group having 1 to 20 carbon atoms, and $R^1$ is hydrogen or a methyl group. The alkyl group may be a straight, branched, or cyclic alkyl group. Suitable alkyl groups include methyl, ethyl, propyl, isopropyl, n butyl, sec butyl, isobutyl, tertbutyl, hexyl, heptyl, 2-ethylhexyl, 2-ethylbutyl, dodecyl, hexadecyl, 2-ethoxyethyl and cyclohexyl. Optionally, the alkyl group may have up to two substituents selected from $C_1$-$C_6$ alkoxy and halogen. Preferably, R is a straight, branched, or cyclic alkyl group having 1 to 10 carbon atoms which is substituted with up to two substituents selected from $C_1$-$C_6$ alkoxy, chlorine and bromine.

The weight average molecular weight of the solid acrylic resin is 1,000 to 9,000 preferably 1,500 to 8,000. The acrylic resin has an acid number of 140 to 250, preferably 160 to 235. In addition, it is critical that the molecular weight and the acid number of the acrylic resin within such ranges be inversely related. For example, it has been determined that a solid acrylic resin having a molecular weight of 8,000 and an acid number of 160 and an acrylic resin having a molecular weight of 1,700 and an acid number of 235 are compatible with a sulfo-polyester in a non alcohol system. However, it has also been determined that an acrylic resin having a molecular weight of 8,000 and an acid number of 200 is not compatible with a sulfo-polyester in a non alcoholic system.

The acrylic resin may optionally contain styrene repeating units, acrylonitrile repeating units, or a mixture thereof. Useful acrylic resins are commercially available under the tradename "JONCRYL", especially JONCRYL 682 and JONCRYL 683 which are styrene/acrylic copolymers from S. C. Johnson and Sons, Inc., Racine, Wis., and "VANCRYL" from Vantage.

The second step of the process involves heating the acrylic resin solution of step (A) at a temperature of about 60° C. to about 99° C. to result in an acrylic resin solution having a pH of 7.5 to 9. In this step, excess ammonia or amine is driven off which decreases the pH. The pH of the acrylic resin solution should not be allowed to fall below 7.5 since precipitation or separation of the acrylic resin solution may occur. Preferably, the temperature for step (B) is 70° C. to 95° C.

The third step involves adding a water-dispersible or water dissipatable sulfo-polyester to the acrylic resin solution of Step (B) at a temperature of 60° C. to 99° C. while continuously applying agitation in order to disperse the sulfo-polyester in the acrylic resin solution. Preferably, the temperature for Step (C) is 75° C. to 95° C. The weight ratio of acrylic resin to sulfo-polyester is 10:90 to 90:10, preferably 70:30 to 30:70.

The sulfo-polyester is a water-dispersible or water-dissipatible, linear polyester. The sulfo-polyester contains repeat units from a dicarboxylic acid, a diol and a difunctional sulfomonomer. The sulfomonomer must be present in an amount of at least 12 mole percent of the dicarboxylic acid component based on 100 mole percent dicarboxylic acid and 100 mole percent diol. Dicarboxylic acids useful in the present invention include aromatic dicarboxylic acids preferably having 8 to 14 carbon atoms, saturated aliphatic dicarboxylic acids preferably having 4 to 12 carbon atoms, and cycloaliphatic dicarboxylic acids preferably having 8 to 12 carbon atoms. Specific examples of dicarboxylic acids are: terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. The sulfo-polyester may be prepared from two or more of the above dicarboxylic acids.

It should be understood that use of the corresponding acid anhydrides, esters, and acid chlorides of these acids is included in the term "dicarboxylic acid".

The diol component of the polyester includes cycloaliphatic diols preferably having 6 to 20 carbon atoms or aliphatic diols preferably having 3 to 20 carbon atoms. Examples of such diols are: ethylene glycol, diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. The sulfo-polyester may be prepared from two or more of the above diols.

The difunctional sulfomonomer component of the sulfo-polyester may be a dicarboxylic acid or an ester thereof containing a sulfonate group ($-SO_3^-$), a diol containing a sulfonate group, or a hydroxy acid containing a sulfonate group. The cation of the sulfonate salt may be $Na+$, $Li+$, $K+$, $NH_4+$, and substituted ammonium. The term "substituted ammonium" refers to ammonium substituted with an alkyl or hydroxy alkyl radical having 1 to 4 carbon atoms. The difunctional sulfomonomer contains at least one sulfonate group attached to an aromatic nucleus wherein the functional groups are hydroxy, carboxy or amino. Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters. The sulfomonomer must present in an amount of at least 12 mole percent, preferably 15 to 25 mole percent, and most preferably 17 to 20 mole percent, based on 100 mole percent dicarboxylic acid. Sulfo polyesters containing less than 12 mole percent of the difunctional sulfomonomer form unstable blends with acrylic resins.

Preferably, the water dispersible sulfo-polyester is derived from a mixture of dicarboxylic acids consisting of isophthalic acid (or ester) and 5-sodio-sulfoisophthalic acid, a diol component consisting of diethylene glycol, or a mixture of diols consisting of 45 to 80 mole percent diethylene glycol with the remaining diol being either ethylene glycol or 1,4-cyclohexane dimethanol. More preferably, the mixture of diols contains 52 to 56 mole percent diethylene glycol and 48 to 44 mole percent 1,4-cyclohexanedimethanol.

The inherent viscosity of the sulfo-polyester should be in the range of 0.1 to 0.5 dl/g as measured in a 60/40 parts by weight solution of phenol/tetrachloroethane at 25° C. at a concentration of 0.25 grams of polymer in 100 mL of the solvent. Preferably, the inherent viscosity of the sulfo-polyester is 0.28 to 0.35 dl/g.

The acrylic resin and the sulfo-polyester should be compatible with each other. The term "compatible" means that a blend of acrylic resin and sulfo polyester in water will not gel or have a significant increase in viscosity after being held at 120° F. (48.9° C.) for 24 hours. The term "gel" means that the blend is not pourable at room temperature.

The fourth step, Step (D), in the process of the present invention involves cooling the polymer blend formed in Step (C). The blend may be used at any temperature, however, for most applications a temperature of about 15° C. to about 25° C. is preferred. It is important to apply agitation, preferably continuously, during this step. Upon cooling, the polymer blend should have a Brookfield viscosity of about 10 cps to about 1,000 cps as measured at 30 rpm. More preferably, the Brookfield viscosity should be 20 cps to 500 cps. The polymer blend contains about 5 to about 50 weight percent solids, preferably 15 to 40 weight percent solids. In addition, the pH of the blend is about 7 to about 8. Upon drying, the polymer blend has an I.V. of about 0.05 to about 0.30, preferably 0.1 to 0.2, and an acid number of about 20 to about 100, preferably 35 to 80.

The materials and testing procedures used for the results shown herein are as follows:

Brookfield viscosity was determined according to ASTM D2196.

Inherent viscosity (I.V.) was determined according to ASTM D2857-70. The I.V. was measured at 25° C. using 0.25 grams of polymer per 100 ml of a solvent consisting of 60% by weight phenol and 40% by weight tetrachloroethane. The units for reporting I.V. are deciliters/gram. The I.V. was determined by heating the polymer/solvent system at 120° C. for 15 minutes, cooling the solution to 25° C. and measuring the time of flow at 25° C. The I.V. is calculated from the equation:

$$(\eta)_{0.50\%}^{25°C.} = \ln \frac{t_s}{t_o}{C}$$

where:
- $(\eta)$ = inherent viscosity at 25° C. at a polymer concentration of 0.25 g/100 mL of solvent;
- ln = natural logarithm;
- $t_s$ = sample flow time;
- $t_o$ = solvent blank flow time; and
- C = concentration of polymer in grams per 100 mL of solvent = 0.25.

The acrylic resins used in the examples are:

Joncryl 682® resin is available from Johnson Wax and is an acrylic resin having a molecular weight of 2,500, an acid number of 230, and a Tg of 50° C.

Joncryl 683® is available from Johnson Wax and is an acrylic resin having a molecular weight of 8,000, an acid number of 150, and a Tg of 74° C.

The water-dispersible sulfo polyesters used in the examples are:

A. Sulfo-Polyester A was prepared as follows: A 500 mL round bottom flask equipped with a ground-glass head, an agitator shaft, nitrogen inlet and a side arm was charged with 74.0 grams of isophthalic acid, 16.0 grams of 5-sodiosulfoisophthalic acid, 106.0 grams of diethylene glycol, sufficient titanium isopropoxide to provide 50 ppm of titanium, and 0.45 grams of sodium acetate tetrahydrate. The flask was immersed in a Belmont bath at 200° C. for two hours under a nitrogen sweep. The temperature of the bath was increased to 280° C. and the flask was heated for one hour under reduced pressure of 0.5 to 0.1 mm of Hg. The flask was allowed to cool to room temperature and the copolyester was removed from the flask. The copolyester had an I.V. of about 0.42 and a glass transition temperature of about 30° C. as measured using a differential scanning calorimeter (DSC). The copolyester was extruded and pelletized.

A 28% solids dispersion of Sulfo-Polyester A in water was prepared by heating the water to a temperature of 75° C. to 85° C. and adding the required amount of pellets while agitating at a rate sufficient to maintain the pellets in suspension. The heating was continued until all the pellets were dispersed, approximately, 20 to 30 minutes. Water was added to replace evaporation loss. The dispersion was cooled and filtered.

B. Sulfo-Polyester B was prepared as follows: A 500 mL round bottom flask equipped with a ground-glass head, an agitator shaft, nitrogen inlet and a side arm was charged with 74.0 grams of isophthalic acid, 16.0 grams of 5-sodiosulfoisophthalic acid, 83.0 grams of diethylene glycol, 16.0 grams of 1,4-cyclohexanedimethanol, sufficient titanium isopropoxide to provide 50 ppm of titanium, and 0.45 grams of sodium acetate tetrahydrate. The flask was immersed in a Belmont bath at 200° C. for one hour under a nitrogen sweep. The temperature of the bath was increased to 230° C. for one hour. The temperature of the bath was increased to 280° C. and the flask was heated for 45 minutes under reduced pressure of 0.5 to 0.1 mm of Hg. The flask was allowed to cool to room temperature and the copolyester was removed from the flask. The copolyester had an I.V. of about 0.36 and a glass transition temperature of about 38° C. as measured using a differential scanning calorimeter (DSC). The copolyester was extruded and pelletized.

A 28% solids dispersion of Sulfo-Polyester B in water was prepared by heating the water to a temperature of 90° C. to 95° C. and adding the required amount of pellets while agitating at a rate sufficient to maintain the pellets in suspension. The heating was continued until all the pellets were dispersed, approximately, 20 to 30 minutes. Water was added to replace evaporation loss. The dispersion was cooled and filtered.

C. Sulfo-Polyester C was prepared as follows: A 500 mL round bottom flask equipped with a ground glass head, an agitator shaft, nitrogen inlet and a side arm was charged with 136.0 grams of isophthalic acid, 53.0 grams of 5-sodiosulfoisophthalic acid, 155.0 grams of diethylene glycol, 78.0 grams of 1,4-cyclohexanedimethanol, sufficient titanium isopropoxide to provide 50 ppm of titanium, and 1.48 grams of sodium acetate tetrahydrate. The flask was immersed in a Belmont bath at 200° C. for one hour under a nitrogen sweep. The temperature of the bath was increased to 230° C. for one hour. The temperature of the bath was increased to 280° C. and the flask was heated for 45 minutes under reduced pressure of 0.5 to 0.1 mm of Hg. The flask was allowed to cool to room temperature and the copolyester was removed from the flask. The copolyester had an I.V. of about 0.33 and a glass transition temperature of about 55° C. as measured using a differential scanning calorimeter (DSC). The copolyester was extruded and pelletized.

A 28% solids dispersion of Sulfo-Polyester C in water was prepared by heating the water to a temperature of 85° C. to 90° C. and adding the required amount of pellets while agitating at a rate sufficient to maintain the pellets in suspension. The heating was continued until all the pellets were dispersed, approximately, 20 to 30 minutes. Water was added to replace evaporation loss. The dispersion was cooled and filtered.

The composition of Sulfo-Polyesters A, B and C are summarized as follows:

| Sulfo-Polyester | IPA Mole % | SIP Mole % | DEG Mole % | CHDM Mole % | I.V. | Tg |
|---|---|---|---|---|---|---|
| A | 89 | 11 | 100 | 0 | .42 | 30 |
| B | 89 | 11 | 78 | 22 | .36 | 38 |
| C | 82 | 18 | 34 | 46 | .33 | 55 |

The invention will be further illustrated by a consideration of the following examples, which are intended to be exemplary of the invention. All parts and percentages in the examples are on a weight basis unless otherwise stated.

EXAMPLE 1

This example illustrates the preparation of an aqueous 70/30 weight percent blend of Sulfo-Polyester C and an acrylic resin. The blend was prepared using the following ingredients:

| INGREDIENTS | AMOUNT (grams) | (wt %) |
|---|---|---|
| Joncryl 682 ® Flakes | 175.0 | 9.0 |
| Polyester C Pellets | 408.0 | 21.0 |
| Ammonium Hydroxide (28% soln.) | 44.0 | 2.2 |
| Water | 1315.0 | 67.8 |

The following procedure was used for preparing the blend:
1. Water and NH$_4$OH were combined to form an alkaline solution. Joncryl 682 ® flakes were added to the alkaline solution while stirring was applied to form a solution.
2. Excess ammonia was removed by heating the solution to 90° C. while continuously stirring the solution.
3. While the solution was at 90° C., Sulfo-Polyester C pellets were added while stirring was continued to form a polymer blend.
4. The polymer blend was allowed to cool to about 25° C. while stirring was continued.

The blend was stored at room temperature for six months during which time no phase separation occurred.

EXAMPLE 2

This example is similar to Example 1 except that Joncryl 683 ® was used instead of Joncryl 682 ®. The polymer blend was prepared using the following ingredients:

| INGREDIENTS | AMOUNT (grams) | (wt %) |
|---|---|---|
| Joncryl 683 Flake | 120.0 | 8.33 |
| Sulfo-Polyester C | 280.0 | 19.45 |
| NH$_4$OH (28% soln.) | 20.0 | 1.39 |
| Water | 1020.0 | 70.83 |

The polymer blend had a solids content of 28.5% and an inherent viscosity of 0.182. The blend was stored at room temperature for six months during which time no phase separation occurred.

EXAMPLE 3

This example is similar to Example 2 except that the ratio of Sulfo polyester C/Joncryl 683 ® was 60/40 instead of 70/30. The polymer blend was prepared using the following ingredients:

| INGREDIENTS | AMOUNT (grams) | (wt %) |
|---|---|---|
| Joncryl 683 ® | 360.0 | 8.56 |
| Sulfo-Polyester C | 540.0 | 12.84 |
| NH$_4$OH (28% soln.) | 90.0 | 2.14 |
| Water | 3214.0 | 76.46 |

The polymer blend had a solids content of 26.4%, an inherent viscosity of 0.181, and a Brookfield viscosity at 25° C. of 10 cps. The blend was stored at room temperature for six months during which time no phase separation occurred.

EXAMPLE 4

This example is similar to Example 2 except that the ratio of Sulfo-Polyester C/Joncryl 683 ® was 65/35 instead of 70/30. The polymer blend was prepared using the following ingredients:

| INGREDIENTS | AMOUNT (grams) | (wt %) |
|---|---|---|
| Joncryl 683 ® | 140.0 | 8.56 |
| Sulfo-Polyester C | 260.0 | 15.90 |
| NH$_4$OH (28% soln.) | 35.0 | 2.14 |
| Water | 1200.0 | 73.40 |

The polymer blend had a solids content of 27.9%, an inherent viscosity of 0.152, and a Brookfield viscosity at 25° C. of 11 cps. The blend was stored at room temperature for six months during which time no phase separation occurred.

EXAMPLE 5

This example is similar to Example 2 except that the ratio of Sulfo-Polyester C/Joncryl 683 ® was 50/50 instead of 70/30. The polymer blend was prepared using the following ingredients:

| INGREDIENTS | AMOUNT | |
|---|---|---|
| | (grams) | (wt %) |
| Joncryl 683 ® Flakes | 150.0 | 14.29 |
| Sulfo-Polyester C | 150.0 | 14.29 |
| NH₄OH (28% soln.) | 37.5 | 3.57 |
| Water | 712.5 | 67.85 |

The polymer blend had a solids content of 31.6%, an inherent viscosity of 0.144, and a Brookfield viscosity at 25° C. of 11.5 cps. The blend was stored at room temperature for six months during which time no phase separation occurred.

EXAMPLE 6

This example is similar to Example 2 except that the ratio of Sulfo-Polyester C/Joncryl 683 ® was 40/60 instead of 70/30. The polymer blend was prepared using the following ingredients:

| INGREDIENTS | AMOUNT | |
|---|---|---|
| | (grams) | (wt %) |
| Joncryl 683 ® Flakes | 180.0 | 16.36 |
| Sulfo-Polyester C | 120.0 | 10.91 |
| NH₄OH (28% soln.) | 45.0 | 4.09 |
| Water | 755.0 | 68.64 |

The polymer blend had a solids content of 29.9%, an inherent viscosity of 0.124, and a Brookfield viscosity at 25° C. of 11.0 cps. The blend was stored at room temperature for six months during which time no phase separation occurred.

EXAMPLE 7

In this example, the freeze thaw stability of the Sulfo-Polyester/acrylic resin blends prepared in Examples 1–6 was examined. Samples of the polymer blends prepared in Examples 1–6 were placed in a freezer at 0° C. After 24 hours, the samples were removed from the freezer, and thawed at 25° C. The Brookfield viscosity of each sample was measured. This process was repeated for up to five freeze-thaw cycles.

The freeze-thaw stability test results indicated that the Brookfield viscosity of the samples did not significantly increase. The Brookfield viscosity of the samples even after five freeze-thaw cycles remained in the range of 10–13 cps. Such results indicate that the polymer blends prepared in Examples 1–6 are freeze-thaw stable.

EXAMPLE 8

In this example, the storage stability or shelf-life of the Sulfo-Polyester/acrylic resin blends prepared in Examples 1–6 was examined. Samples of the polymer blends prepared in Examples 1–6 were stored at 0° C., 25° C. and 50° C. for three weeks. The Brookfield viscosity of each sample was determined at the end of the storage period and compared to the initial Brookfield viscosity.

The storage stability test results indicated that the Brookfield viscosity of the samples did not significantly increase. The Brookfield viscosity of the samples even after being stored for three weeks at 0° C., 25° C. and 50° C. remained in the range of 10–13 cps. Such results indicate that the polymer blends prepared in Examples 1–6 are storage stable. The pH remained constant during the storage period.

EXAMPLE 9

In this example, an aqueous 70/30 weight percent blend of Sulfo-Polyester C and an acrylic resin was prepared using temperature conditions that fall outside the range acceptable to the process of the present invention. The acrylic resin solution was prepared using the following ingredients:

| INGREDIENTS | AMOUNT | |
|---|---|---|
| | (grams) | (wt %) |
| Joncryl 682 ® Flakes | 175.0 | 30.0 |
| Ammonium Hydroxide (28% soln.) | 44.0 | 7.5 |
| Water | 364.0 | 62.5 |

The following procedure was used for preparing the blend:
1. Water and NH₄OH were combined to form an alkaline solution. Joncryl 682 ® flakes were added to the alkaline solution while stirring was applied to form an acrylic resin solution.
2. Excess ammonia was removed from the acrylic resin solution by heating the solution to 70°–80° C. while continuously stirring the solution. The solution was allowed to cool to 25° C.
3. Sulfo-Polyester C which is in the form of a 28% dispersion was prepared.
4. The acrylic polymer solution of Step (2) was added to the Sulfo-Polyester C dispersion with agitation.

The polymer blend gelled within 24 hours.

EXAMPLE 10

Water-based inks were prepared using the polymer blends of Examples 1–6. The composition of the water-based inks were as follows:

| INGREDIENTS | (wt %) |
|---|---|
| Blue Pigment (PV Fast Blue B2G-A) Millbase | 10.0 |
| Polymer Blends (Examples 1–6) | 75.0 |
| Water | 15.0 |

The water-based ink samples were applied to aluminum foil, polyester film and coated paper with Nos. 3 and 6 Meyer rods. The samples were either allowed to dry for 24 hours at 25° C. or were dried in an oven at 100° C. for three seconds. Water resistance of the samples was determined by a water spot test wherein distilled water drops were left for 5, 10, 15 and 20 minutes and then wiped off gently with a tissue. The integrity of the ink films was visually assessed and rated as follows:
Poor: Total film removed
Fair: Partial film removed
Good: Dull or discolored film, but no removal
Excellent: The film was substantially unchanged The effect of water drops on the water-based ink films prepared using the polymer blends of Examples 1–6 resulted in dull or discolored film but no removal. The films, therefore, achieved a rating of "Good".

EXAMPLE 11

The water-based ink samples prepared in accordance with Example 10 were tested to determine blocking resistance. The water-based ink samples were applied to aluminum foil, polyester film and coated paper with Nos. 3 and 6 Meyer rods. The samples were evaluated for blocking temperature using a PI Sentinel Heat Sealer at 40 psi for five seconds. Blocking temperature is the highest temperature at which the printed ink retains blocking resistance. The samples were folded such that the printed surface was face-to-face. The folded samples were placed under the PI Sentinel Sealer at different temperatures until blocking occurred. The blocking resistance of the ink films was visually assessed and rated as follows:

Poor: Picked and complete film removed
Fair: Picked, but partial film removed
Good: Slightly picked, but no film removed
Excellent: No picking and no film removed The blocking temperature was in the range of 140°-160° F. for the water based ink films prepared using the polymer blends of Examples 1-6. The films, therefore, achieved a rating of "Good".

EXAMPLE 12

This example is similar to Example 5 except that Sulfo-Polyester B was substituted for Sulfo-Polyester C. The polymer blend was prepared using the following ingredients:

| INGREDIENTS | AMOUNT | |
| --- | --- | --- |
| | (grams) | (wt %) |
| Joncryl 683 ® Flakes | 150.0 | 14.29 |
| Sulfo-Polyester B | 150.0 | 14.29 |
| NH4OH (28% soln.) | 37.5 | 3.57 |
| Water | 712.5 | 67.85 |

The polymer blend has a solids content of 31.6%. The blend was not stable and separated into two phases.

EXAMPLE 13

Example 12 was repeated except that Sulfo-Polyester A was substituted for Sulfo-Polyester B. The blend was not stable, and separated into two phases.

EXAMPLE 14

This example demonstrates the use of Sulfo-Polyester C/acrylic resin blends in pigment grinding to prepare ink millbases. The following ingredients were used for grinding pigments:

| INGREDIENTS | AMOUNT | |
| --- | --- | --- |
| | (grams) | (wt %) |
| Polyester C/Joncryl 683 ® Blend | 250.0 | 50.0 |
| Blue Pigment PV Fast Blue B2G-A | 125.0 | 25.0 |
| Water | 125.0 | 25.0 |

Millbase was prepared by adding pigment to the diluted polymer blend. The mixture was shaken using equal weight of glass beads for four hours on a paint shaker. The millbase was filtered using cheese cloth. The millbase was stored in a plastic/glass container. The average particle size of the pigment in the millbase was about 2.0 μm as measured by light scattering method. The gloss of the film on coated paper ranged between 20-30 at 60° C.

Many variations will suggest themselves to those skilled in this art in light of the above detailed description. All such obvious modifications are within the full intended scope of the appended claims.

What is claimed is:

1. A process for preparing aqueous sulfo-polyester/acrylic resin blends without volatile organic compounds, said process comprising the following steps:

(A) contacting a solid acrylic resin having a weight average molecular weight of 1,000 to 9,000 and an acid number of 140 to 250 with a solubilizing amount of an alkaline solution comprising an amine or ammonium compound dissolved in water so as to achieve an acrylic resin solution having a pH of at least 8, said acrylic resin comprising repeating units of the formula

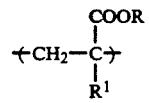

wherein R is selected from the group consisting of hydrogen and an alkyl group having 1 to 20 carbon atoms, and $R^1$ is selected from the group consisting of hydrogen and methyl, provided that the molecular weight and acid number of the acrylic resin is inversely related;

(B) heating the acrylic resin solution of step (A) at a temperature of 60° C. to 99° C. to result in an acrylic resin solution having a pH of 7.5 to 9;

(C) contacting the acrylic resin solution of step (B) with a water dispersible polyester consisting essentially of repeat units from:

(a) a dicarboxylic acid selected from the group consisting of aromatic dicarboxylic acids, saturated aliphatic dicarboxylic acids, cycloaliphatic dicarboxylic acids, and combinations thereof;

(b) a diol; and (c) a difunctional sulfomonomer containing at least one sulfonate group attached to an aromatic nucleus wherein the functional groups are hydroxy, carboxy or amino, provided the difunctional sulfomonomer is present in an amount from 12 to 25 mole percent based on 100 mole percent dicarboxylic acid and 100 mole percent diol;

said contacting occurring under agitation and at a temperature of 60° C. to 99° C. to result in a polymer blend wherein the sulfo-polyester is dispersed in the acrylic resin solution, and the weight ratio of acrylic resin to sulfo-polyester is 10:90 to 90:10; and (D) cooling the polymer blend while applying agitation.

2. The process of claim 1 wherein R in the acrylic resin formula is a straight, branched, or cyclic alkyl group having 1 to 10 carbon atoms.

3. The process of claim 1 wherein R in the acrylic resin formula is substituted with up to 2 substituents independently selected from the group consisting of a $C_1$-$C_6$ alkoxy group and a halogen.

4. The process of claim 3 wherein the halogen is selected from the group consisting of chlorine and bromine.

5. The process of claim 3 wherein the $C_1$-$C_6$ alkoxy group is selected from the group consisting of methyl, ethyl, propyl, isopropyl, n-butyl, sec-butyl, isobutyl, tertbutyl, hexyl, heptyl, 2-ethylhexyl, 2-ethylbutyl, dodecyl, hexadecyl, 2-ethoxyethyl, and cyclohexyl.

6. The process of claim 1 wherein the molecular weight of the acrylic resin is 1,500 to 8,000.

7. The process of claim 1 wherein the acrylic resin has an acid number of 160 to 235.

8. The process of claim 1 wherein the sulfo-polyester has an inherent viscosity of 0.1 to 0.5 as measured in a 60/40 parts by weight solution of phenol/tetrachloroethane at 25° C. at a concentration of 0.25 grams of polymer in 100 mL of the solvent.

9. The process of claim 1 wherein the acrylic resin is a styrene acrylic copolymer.

10. The process of claim 9 wherein the acrylic resin contains 20 to 60 weight percent of styrene.

11. The process of claim 1 wherein the sulfo-polyester additionally contains at least one difunctional reactant selected from the group consisting of a hydroxycarboxylic acid having one —CR$_2$—OH group, an aminocarboxylic acid having one —NHR$_2$ group, an aminoalcohol having one —CH$_2$—OH group and one —NHR$_2$ group, and mixtures thereof, wherein R$_2$ is independently selected from the group consisting of hydrogen and an alkyl group having 1 to 4 carbon atoms.

12. The process of claim 1 wherein the dicarboxylic acid component of the sulfo-polyester is selected from the group consisting of terephthalic acid, phthalic acid, isophthalic acid, naphthalene-2,6-dicarboxylic acid, cyclohexanedicarboxylic acid, cyclohexanediacetic acid, and mixtures thereof.

13. The process of claim 12 wherein the dicarboxylic acid component is isophthalic acid.

14. The process of claim 1 wherein the diol component of the sulfo-polyester is selected from the group consisting of ethylene glycol, diethylene glycol, triethylene glycol, 1,4-cyclohexanedimethanol, and mixtures thereof.

15. The process of claim 14 wherein the diol component is a mixture of diethylene glycol and 1,4-cyclohexanedimethanol.

16. The process of claim 1 wherein the difunctional sulfomonomer component of the sulfo-polyester is selected from the group consisting of sulfophthalic acid, sulfoterephthalic acid, sulfoisophthalic acid, 4-sulfonaphthalene-2,7-dicarboxylic acid; and esters thereof.

17. The process of claim 16 wherein the difunctional sulfomonomer is 5-sodio-sulfoisophthalic acid.

18. The process of claim 1 wherein the sulfo-polyester has repeat units from isophthalic acid, diethylene glycol and 1,4-cyclohexanedimethanol, and 5-sodio-sulfoisophthalic acid.

19. An ink composition comprising the sulfo-polyester/acrylic resin blend produced by the process of claim 1.

* * * * *